(12) United States Patent
Okimoto et al.

(10) Patent No.: US 12,164,762 B2
(45) Date of Patent: *Dec. 10, 2024

(54) INFORMATION PROCESSING DEVICE, INFORMATION PROCESSING METHOD, AND PROGRAM

(71) Applicant: Sony Group Corporation, Tokyo (JP)

(72) Inventors: Koyuru Okimoto, Tokyo (JP); Toru Nakagawa, Chiba (JP); Tetsu Magariyachi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,111

(22) Filed: Sep. 6, 2023

(65) Prior Publication Data

US 2023/0409185 A1 Dec. 21, 2023

Related U.S. Application Data

(63) Continuation of application No. 17/278,551, filed as application No. PCT/JP2019/037515 on Sep. 25, 2019, now Pat. No. 11,775,164.

(30) Foreign Application Priority Data

Oct. 3, 2018 (JP) ................ 2018-188473

(51) Int. Cl.
*G06F 3/0487* (2013.01)
*G06F 3/0484* (2022.01)

(52) U.S. Cl.
CPC .......... *G06F 3/0487* (2013.01); *G06F 3/0484* (2013.01)

(58) Field of Classification Search
CPC ...... G06F 3/0487; G06F 3/0484; G06F 3/167; G06F 3/16; H04S 2420/01; H04S 7/304;
(Continued)

(56) References Cited

U.S. PATENT DOCUMENTS 11,595,772 B2  2/2023 Fukuda et al.
11,775,164 B2 * 10/2023 Okimoto ............... G06F 3/0484
                                                345/156
(Continued)

FOREIGN PATENT DOCUMENTS

CN  102254164 A  11/2011
CN  103765366 A   4/2014
(Continued)

OTHER PUBLICATIONS

Extended European Search Report issued Oct. 14, 2021 in connection with European Application No. 19869013.3.
(Continued)

*Primary Examiner* — Amit Chatly
(74) *Attorney, Agent, or Firm* — Wolf, Greenfield & Sacks, P.C.

(57) ABSTRACT

It is possible for a user to measure his/her head-related transfer characteristics with high accuracy. There is provided an information processing device 10 including: an interface control unit 140 that controls a user interface related to measurement of a head-related transfer function of a user, in which the interface control unit controls an output of guide information guiding a direction of a head of the user to a designated direction. In addition, there is provided an information processing method including: controlling a user interface related to measurement of a head-related transfer function of a user by a processor 871, in which the controlling of the user interface further includes controlling an output of guide information guiding a direction of a head of the user to a designated direction.

16 Claims, 11 Drawing Sheets

(58) Field of Classification Search
CPC .. H04S 7/40; H04R 5/027; H04R 5/00; H04R 29/00; G10K 11/18
See application file for complete search history.

(56) References Cited

U.S. PATENT DOCUMENTS

| | | | |
|---|---|---|---|
| 2012/0183161 | A1 | 7/2012 | Agevik et al. |
| 2015/0306330 | A1 | 10/2015 | Richard |
| 2016/0156840 | A1* | 6/2016 | Arai .................... H04N 23/611 348/77 |
| 2016/0249151 | A1 | 8/2016 | Grosche et al. |
| 2017/0359672 | A1* | 12/2017 | Lyren .................... H04S 7/303 |
| 2018/0091921 | A1 | 3/2018 | Silva |
| 2018/0227690 | A1* | 8/2018 | Lyren .................... H04S 7/301 |
| 2019/0014431 | A1* | 1/2019 | Lee .................... H04S 7/303 |
| 2019/0377481 | A1 | 12/2019 | Otsuka et al. |
| 2021/0385600 | A1 | 12/2021 | Fukuda et al. |
| 2022/0027033 | A1 | 1/2022 | Okimoto et al. |

FOREIGN PATENT DOCUMENTS

| | | |
|---|---|---|
| CN | 303622206 S | 3/2016 |
| CN | 107004240 A | 8/2017 |
| CN | 206610308 U | 11/2017 |
| CN | 108369476 A | 8/2018 |
| JP | 2007-251248 A | 9/2007 |
| JP | 2017091059 A | 5/2017 |
| WO | WO 2012/028906 A1 | 3/2012 |
| WO | WO 2016/065137 | 4/2016 |
| WO | WO 2018/063522 A1 | 4/2018 |
| WO | WO 2018/110269 A1 | 6/2018 |

OTHER PUBLICATIONS

Communication pursuant to Article 94(3) EPC dated Jan. 26, 2023 in connection with European Application No. 19869013.3.
International Search Report and English translation thereof mailed Nov. 19, 2019 in connection with International Application No. PCT/JP2019/037515.
International Written Opinion and English translation thereof mailed Nov. 19, 2019 in connection with International Application No. PCT/JP2019/037515.
International Preliminary Report on Patentability and English translation thereof mailed Apr. 15, 2021 in connection with International Application No. PCT/JP2019/037515.

* cited by examiner

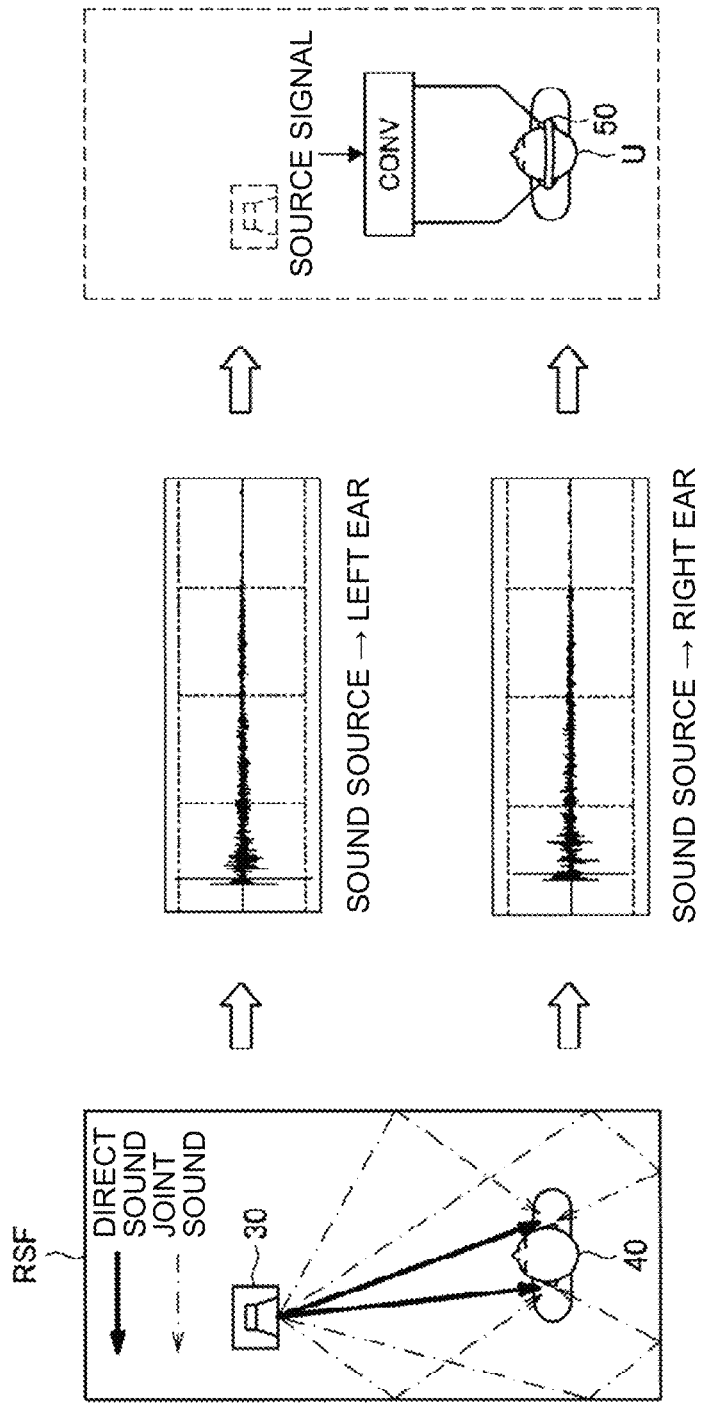

INFORMATION PROCESSING DEVICE, INFORMATION PROCESSING METHOD, AND PROGRAM

CROSS-REFERENCE TO RELATED APPLICATIONS

The present application claims the benefit under 35 U.S.C. § 120 as a continuation application of U.S. application Ser. No. 17/278,551, filed on Mar. 22, 2021, now U.S. Pat. No. 11,775,164, which claims the benefit under 35 U.S.C. § 371 as a U.S. National Stage Entry of International Application No. PCT/JP2019/037515, filed in the Japanese Patent Office as a Receiving Office on Sep. 25, 2019, which claims priority to Japanese Patent Application Number JP2018-188473, filed in the Japanese Patent Office on Oct. 3, 2018, each of which is hereby incorporated by reference in its entirety.

FIELD

The present disclosure relates to an information processing device, an information processing method, and a program.

BACKGROUND

In recent years, a head-related transfer function (HRTF) indicating transfer characteristics of sound from a sound source to both ears has attracted attention. In addition, a method of efficiently measuring the head-related transfer function has also been proposed. For example, Patent Literature 1 discloses a technology of shortening a measurement time of the head-related transfer function to reduce a burden on a subject.

CITATION LIST

Patent Literature

Patent Literature 1: JP 2007-251248 A

SUMMARY

Technical Problem

However, a measuring method as disclosed in Patent Literature 1 requires a large-scale measuring facility, and it is thus difficult for a general user to easily measure his/her head-related transfer characteristics.

Solution to Problem

According to the present disclosure, an information processing device, comprising: an interface control unit that controls a user interface related to measurement of a head-related transfer function of a user, wherein the interface control unit controls an output of guide information guiding a direction of a head of the user to a designated direction, is provided.

Furthermore, according to the present disclosure, an information processing method, comprising: controlling a user interface related to measurement of a head-related transfer function of a user by a processor, wherein the controlling of the user interface further includes controlling an output of guide information guiding a direction of a head of the user to a designated direction, is provided.

Moreover, according to the present disclosure, a program for causing a computer to function as an information processing device, the information processing device including: an interface control unit that controls a user interface related to measurement of a head-related transfer function of a user, wherein the interface control unit controls an output of guide information guiding a direction of a head of the user to a designated direction, is provided.

BRIEF DESCRIPTION OF DRAWINGS

FIG. 11 is a diagram for describing measurement of a general head-related transfer function using a dummy head microphone.

DESCRIPTION OF EMBODIMENTS

Figure 1:
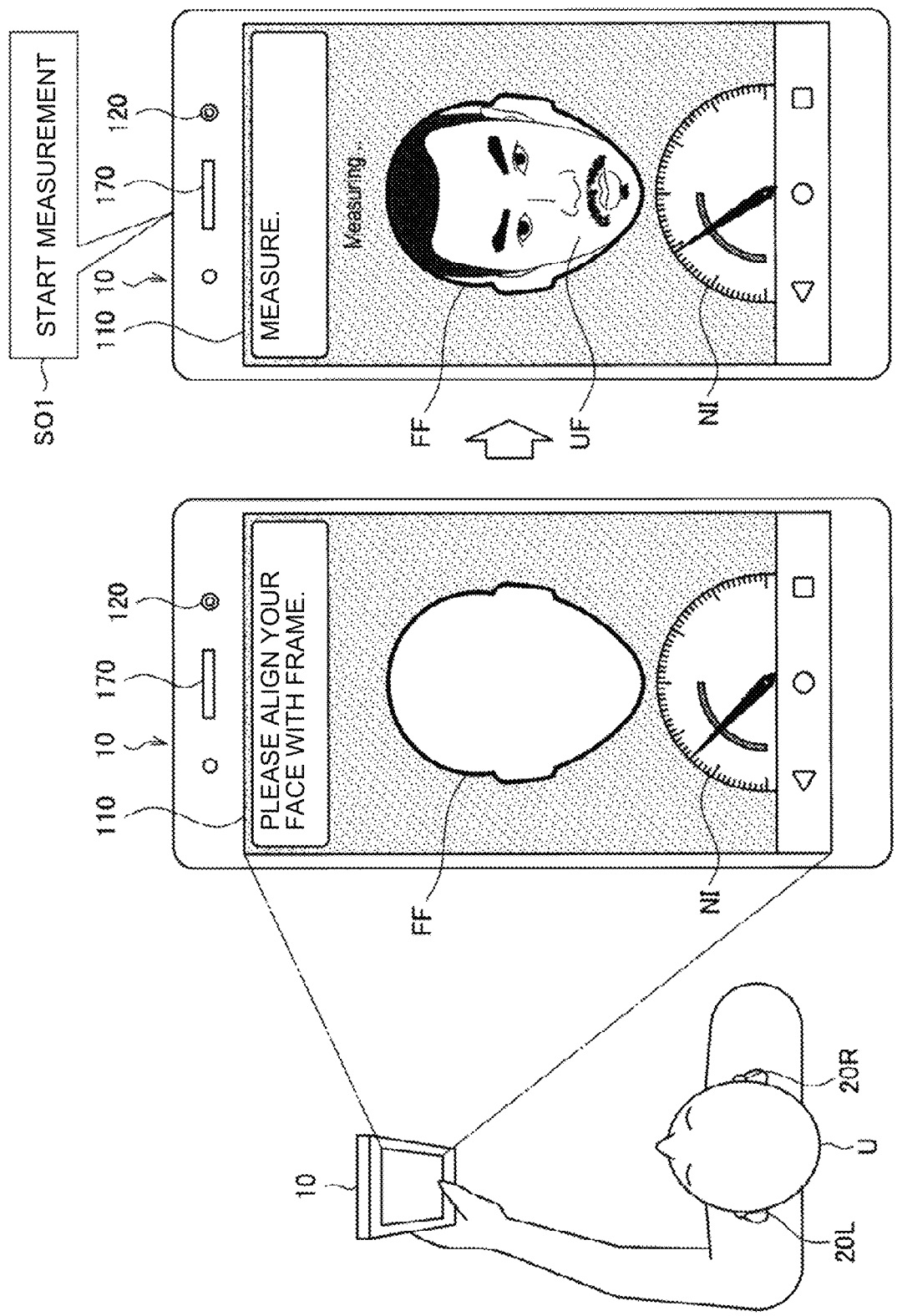
FIG. 1 is a diagram illustrating an example of a user interface and guide information according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals, and an overlapping description thereof will be omitted.

Note that a description will be given in the following order.

1. Embodiment
1.1. Outline
1.2. Functional configuration example of information processing device 10
1.3. Specific example of control
1.4. Flow of control
2. Hardware configuration example
3. Summary

1. Embodiment

<<1.1. Outline>>

First, an outline of an embodiment of the present disclosure will be described. As described above, in recent years, a head-related transfer function (HRTF) mathematically expressing transfer characteristics of sound from a sound source to both ears has attracted attention. According to the head-related transfer function, it becomes possible to cause, for example, a sound output device such as a headphone or the like to three-dimensionally express a sound image.

Note that the head-related transfer function is generally measured using a dummy head microphone. Here, measurement of a general head-related transfer function using a dummy head microphone will be described with reference to FIG. 11.

In the measurement of the general head-related transfer function, first, as illustrated on a left side of FIG. 11, a speaker 30 and a dummy head microphone 40 are installed in a reference sound field RSF to be reproduced by a headphone 50.

Next, a measurement signal is reproduced from the speaker 30, and as illustrated in the center of FIG. 11, head-related transfer functions of each of a left ear and a right ear are acquired by microphones each provided at both ear positions of the dummy head microphone 40.

Next, as illustrated on a right side of FIG. 11, processing for convoluting the head-related transfer functions of each of the left and right ears is performed on a voice signal (source signal) to be reproduced to generate signals for the left ear and the right ear. By reproducing the signals generated as described above on the headphone 50, a sound image can be expressed three-dimensionally.

The measurement of the head-related transfer function using the dummy head microphone has been described hereinabove. On the other hand, in recent years, it has been known that an effect of the three-dimensional expression of the sound image as described above is further improved by using a head-related transfer function measured for each user.

However, large-scale measurement facilities as an anechoic chamber, a listening room, a large speaker, or the like, are required for measurement of head-related transfer characteristics. For this reason, there was a situation in which it is difficult for a general user to easily measure his/her head-related transfer characteristics.

In addition, in order to measure an effective head-related transfer function with high accuracy, it is required to clarify a relative position between a sound source that outputs a measurement signal and both ears of the user. However, in a case where a user who lacks technical knowledge tries to measure the head-related transfer function by himself/herself, it is difficult to grasp a position or a posture suitable for the measurement.

A technical idea according to the present disclosure has been made in view of the above point, and enables the user to measure his/her head-related transfer characteristics with high accuracy. For this reason, an information processing device 10 according to an embodiment of the present disclosure includes an interface control unit 140 that controls a user interface related to measurement of a head-related transfer function of the user. In addition, one of features of the interface control unit 140 according to the embodiment of the present disclosure is to control an output of guide information guiding a direction of a head of the user to a designated direction.

FIG. 1 is a diagram illustrating an example of a user interface and guide information according to the present embodiment. FIG. 1 illustrates a control example of a user interface when a user U measures his/her head-related transfer function using the information processing device 10 according to the present embodiment. Note that FIG. 1 illustrates an example of a case where the information processing device 10 according to the present embodiment is a smartphone.

First, the user U activates the user interface according to the present embodiment by wearing microphones 20L and 20R on a left ear and a right ear and operating the information processing device 10, as illustrated on a left side of FIG. 1. In the center of FIG. 1, an example of a graphical user interface (GUI) that the interface control unit 140 causes a display unit 110 to display based on the operation of the user U is illustrated. As such, the user interface according to the present embodiment may include the GUI.

At this time, one of features of the interface control unit 140 according to the present embodiment is to allow guide information guiding a direction of a head of the user U to a designated direction to be output. Here, the designated direction described above may be a direction suitable for measuring a head-related transfer function. For example, in a case where it is desired to output a measurement signal from a front direction of the user U to measure the head-related transfer function of the user U, the designated direction described above may be a direction in which a voice output unit 170 outputting the measurement signal related to the measurement of the head-related transfer function is located with the user U as a starting point. That is, the designated direction according to the present embodiment can be set so that the user U and the voice output unit 170 face each other, for example.

The interface control unit 140 according to the present embodiment can fix a posture of the user at positions of both ears suitable for the measurement of the head-related transfer function to realize highly accurate measurement of the head-related transfer function, by guiding the direction of the head of the user U to the designated direction as described above.

Here, an example of the guide information whose output is controlled by the interface control unit 140 according to the present embodiment will be described. The guide information according to the present embodiment includes, for example, various visual information. The interface control unit 140 according to the present embodiment may cause the display unit 110 to display a guide object guiding the direction of the head of the user U to the designated direction.

In addition, the interface control unit 140 according to the present embodiment may cause the display unit 110 to display an image of the user U captured by an image capturing unit 120 in real time and superimpose the guide object on the image.

For example, in a case of the example illustrated in FIG. 1, the interface control unit 140 causes the display unit 110 to display a frame object FF having a head shape according to the designated direction and a message guiding a position of a face in the captured image so as to be aligned with the frame object FF as the guide information.

According to the control as described above by the interface control unit 140 according to the present embodiment, the user U can easily align a position of a face UF with the frame object FF while confirming his/her image, and can take a posture suitable for measuring the head-related transfer function without particular consciousness.

In addition, the interface control unit 140 according to the present embodiment may control an output of start notification information indicating the start of the measurement of the head-related transfer function, based on the determination of a recognition unit 150 that the direction of the head of the user U has substantially coincided with the designated direction. At this time, the recognition unit 150 may determine that the direction of the head of the user U has substantially coincided with the designated direction, for example, based on the fact that the face UF of the user U in the captured image is contained inside the frame object FF.

On a right side of FIG. 1, a case where the interface control unit 140 causes the voice output unit 170 to output a system utterance SO1 indicating the start of the measurement and causes the display unit 110 to display a message indicating the start of the measurement, as an example of the start notification information is illustrated.

According to the start notification information as described above, the user U can be guided to fix his/her head at the time of the start of the measurement, such that it becomes possible to measure the head-related transfer function with high accuracy.

In addition, the interface control unit 140 according to the present embodiment may control the start, interruption or the like of measurement processing of the head-related transfer function. For example, the interface control unit 140 according to the present embodiment may cause a signal processing unit 160 to be described later to start the measurement processing of the head-related transfer function based on the determination of the recognition unit 150 that the direction of the head of the user U has substantially coincided with the designated direction.

In addition, for example, the interface control unit 140 according to the present embodiment may cause the signal processing unit 160 to interrupt the measurement processing of the head-related transfer function in a case where the recognition unit 150 has determined that the direction of the head of the user U has not substantially coincided with the designated direction from after the interface control unit 140 causes the signal processing unit 160 to start the measurement processing of the head-related transfer function until the measurement processing ends.

According to the above function of the interface control unit 140 according to the present embodiment, in a case where the direction of the head of the user U has deviated from the designated direction during the measurement, that is, in a case where the posture of the user U becomes unsuitable for the measurement of the head-related transfer function, it is possible to maintain accuracy of the acquired head-related transfer function by causing the signal processing unit 160 to interrupt the measurement processing.

Note that the interface control unit 140 can also perform the control as described above based on a noise level around the user U. For example, the interface control unit 140 according to the present embodiment may control the signal processing unit 160 so that the measurement processing of the head-related transfer function is not started in a case where the noise level measured by the recognition unit 150 exceeds a threshold value.

In addition, for example, the interface control unit 140 according to the present embodiment may cause the signal processing unit 160 to interrupt the measurement processing of the head-related transfer function in a case where it has been detected that the noise level exceeds the threshold value after the interface control unit 140 causes the signal processing unit 160 to start the measurement processing of the head-related transfer function.

According to the above control by the interface control unit 140 according to the present embodiment, it is possible to prevent a low-accuracy head-related transfer function from being acquired in an environment with a high noise level.

In addition, the interface control unit 140 according to the present embodiment may cause the display unit 110 to display noise information NI regarding the noise level measured by the recognition unit 150, for example, as illustrated in FIG. 1. In a case of the example illustrated in FIG. 1, the interface control unit 140 displays the noise information NI as a meter, and presents a current noise level and a noise level band (hatched portion in FIG. 1) permitting the measurement to the user U.

According to the display as described above, it becomes possible to cause the user U to grasp whether or not the noise level in the surrounding environment is in a state suitable for the measurement of the head-related transfer function and guide the user to move to a place where the noise level is low, for example, in a case where the noise level is high.

The outline of the user interface controlled by the interface control unit 140 according to the present embodiment has been described hereinabove. According to the above-mentioned control by the interface control unit 140 according to the present embodiment, by guiding the user to take the posture suitable for the measurement, it becomes possible for the user to easily and accurately measure his/her head-related transfer characteristics.

<<1.2. Functional Configuration Example of Information Processing Device 10>>

Next, a functional configuration example of the information processing device 10 according to the present embodiment will be described. The information processing device 10 according to the present embodiment may be, for example, a mobile terminal such as a smartphone, a tablet or the like.

Figure 2:
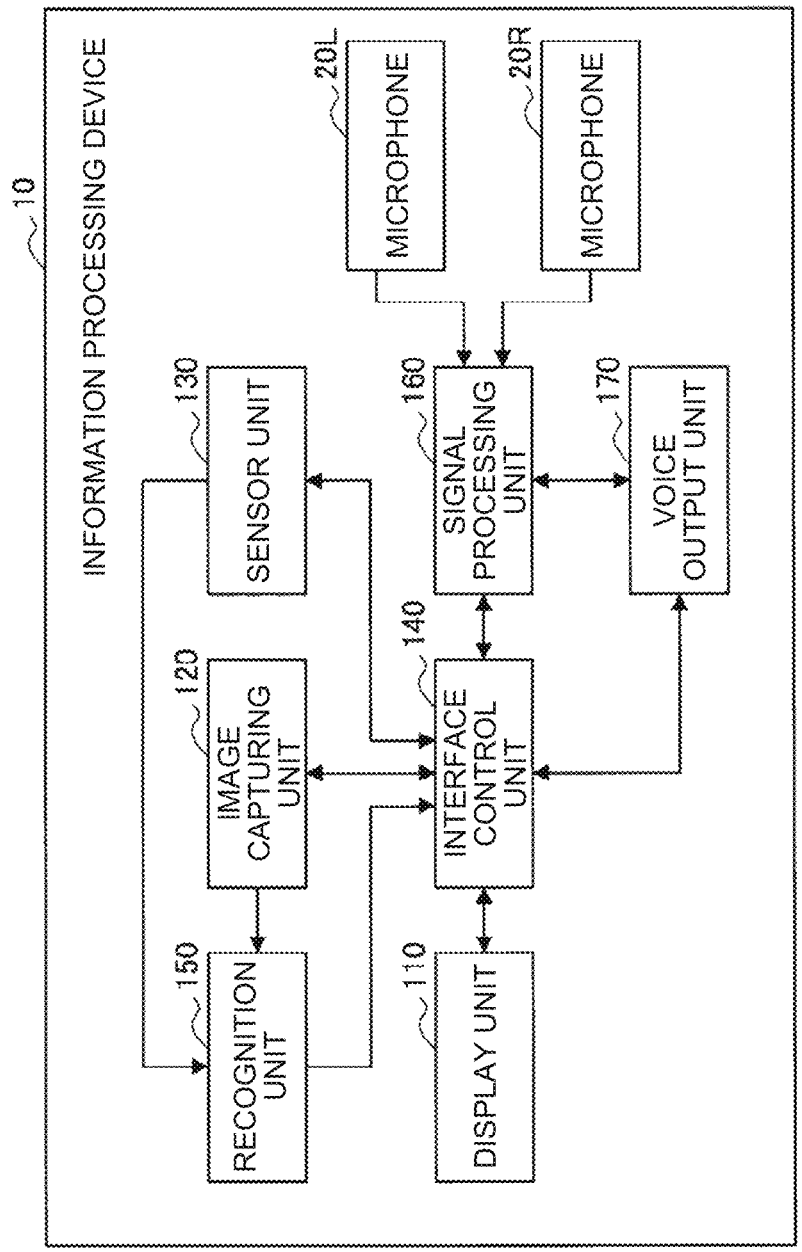
FIG. 2 is a block diagram illustrating a functional configuration example of an information processing device according to the embodiment.

FIG. 2 is a block diagram illustrating a functional configuration example of the information processing device 10 according to the present embodiment. As illustrated in FIG. 2, the information processing device 10 according to the present embodiment includes the display unit 110, the image capturing unit 120, a sensor unit 130, the interface control unit 140, the recognition unit 150, the signal processing unit 160, and the voice output unit 170.

(Display Unit 110)

The display unit 110 according to the present embodiment displays a GUI related to the measurement of the head-related transfer function based on the control by the interface control unit 140. For this reason, the display unit 110 relates to the present embodiment.

For this reason, the display unit 110 according to the present embodiment includes a display device or the like that presents visual information. Examples of the display device include a liquid crystal display (LCD) device, an organic light emitting diode (OLED) device, a touch panel, and the like.

(Image Capturing Unit 120)

The image capturing unit 120 according to the present embodiment has a function of capturing, for example, an image or the like of the user. For this reason, the image capturing unit 120 according to the present embodiment includes an image capturing device capable of capturing an image. Note that the above image includes a moving image as well as a still image.

(Sensor Unit 130)

The sensor unit 130 according to the present embodiment has a function of collecting various sensor information regarding the information processing device 10 or the surrounding environment. The sensor information collected by the sensor unit 130 is used for various recognition processing by the recognition unit 150. The sensor unit 130 according to the present embodiment includes, for example, a gyro sensor, an acceleration sensor, a geomagnetic sensor, a microphone, and the like.

(Interface Control Unit 140)

The interface control unit 140 according to the present embodiment has a function of controlling the user interface related to the measurement of the head-related transfer function of the user. As described above, one of features of the interface control unit 140 according to the present embodiment is to control the output of the guide information guiding the direction of the head of the user to the designated direction.

(Recognition Unit 150)

The recognition unit 150 according to the present embodiment performs various recognition processing based on the image captured by the image capturing unit 120 or the sensor information collected by the sensor unit 130. For example, the recognition unit 150 according to the present embodiment recognizes the direction of the head of the user. The recognition unit 150 may recognize the direction of the head of the user based on the image captured by the image capturing unit 120.

In addition, as described above, the recognition unit 150 can also determine that the direction of the head of the user substantially coincides with the designated direction, for example, based on the fact that the face of the user in the captured image is contained inside the frame object.

In addition, for example, in a case where a microphone 20 worn by the user includes a gyro sensor or the like, the recognition unit 150 may recognize the direction of the head of the user based on the sensor information acquired from the microphone 20.

In addition, the recognition unit 150 according to the present embodiment has a function of measuring a noise level in the surrounding environment based on the sound information collected by the sensor unit.

(Signal Processing Unit 160)

The signal processing unit 160 according to the present embodiment starts the measurement processing of the head-related transfer function based on the control by the interface control unit 140. For example, the signal processing unit 160 according to the present embodiment may cause the voice output unit 170 to output a measurement signal based on a measurement start instruction input from the interface control unit 140.

In addition, the signal processing unit 160 according to the present embodiment receives the head-related transfer functions acquired by the microphones 20L and 20R worn by the user, and performs convolution processing based on the head-related transfer functions to generate voice signals for the left ear and the right ear. Note that the signal processing unit 160 according to the present embodiment can generate the voice signal using a known convolution technology. The signal processing unit 160 according to the present embodiment may use, for example, a technology disclosed in JP 2014-060691 A filed by an applicant of the present disclosure.

(Voice Output Unit 170)

The voice output unit 170 according to the present embodiment outputs a voice based on the control by the interface control unit 140 or the signal processing unit 160. For example, the voice output unit 170 according to the present embodiment may output the guide information or the start notification information based on the control by the interface control unit 140. In addition, for example, the voice output unit 170 according to the present embodiment may output the measurement signal based on the control by the signal processing unit 160.

The functional configuration example of the information processing device 10 according to the present embodiment has been described hereinabove. Note that the configuration described above with reference to FIG. 2 is merely an example, and a functional configuration of the information processing device 10 according to the present embodiment is not limited to such an example. For example, the information processing device 10 according to the present embodiment may be realized as a server, and control a mobile terminal including a display unit, an image capturing unit, a voice output unit, and the like via a network. In addition, the information processing device 10 according to the present embodiment may be realized as a microphone that the user wears on his/her ear, and control the mobile terminal via the network. The functional configuration of the information processing device 10 according to the present embodiment can be flexibly modified according to specifications or operations.

<<1.3. Specific Example of Control>>

Next, the control by the interface control unit 140 according to the present embodiment will be described in more detail with reference to FIGS. 3 to 6 together with specific examples. FIGS. 3 to 6 are diagrams illustrating specific examples of interface control according to the embodiment.

For example, a case where the interface control unit 140 according to the present embodiment causes the display unit 110 to display the frame object having the head shape as the guide information has been described in FIG. 1, but the guide information according to the present embodiment is not limited to such an example. The guide object according to the present embodiment may be, for example, a wearable object worn on the head.

Figure 3:
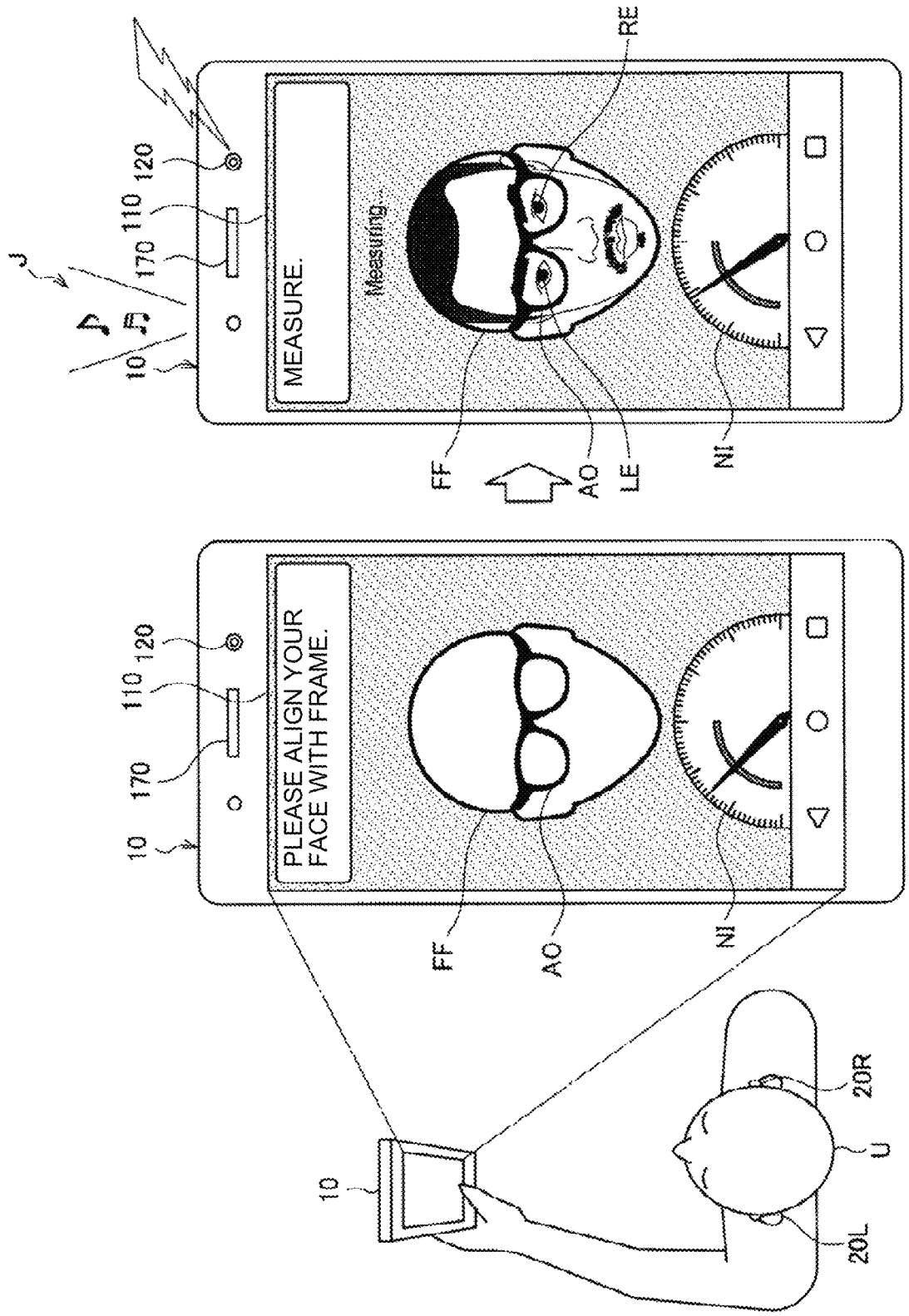
FIG. 3 is a diagram illustrating a specific example of interface control according to the embodiment.

In a case of the example illustrated in FIG. 3, the interface control unit 140 according to the present embodiment causes the display unit 110 displays an wearable object AO having an eyeglass shape in addition to the frame object FF having the head shape.

By causing the display unit 110 to display such a wearable object AO, it is possible to further improve a guidance effect related to the direction of the head of the user as compared with a case of causing the display unit 110 to display only the frame object FF.

At this time, the interface control unit 140 according to the present embodiment may cause the signal processing unit 160 to start the measurement processing of the head-related transfer function, based on recognition of the recognition unit 150 that a left eye LE and a right eye RE of the user are contained in assumed positions within the wearable object AO as well as that the face FF of the user U is contained inside the frame object FF. According to the above control by the interface control unit 140 according to the present embodiment, it is possible to cause the user U to take a posture more suitable for the measurement to measure the head-related transfer function with high accuracy.

Note that the wearable object AO according to the present embodiment is not limited to having the eyeglass shape as illustrated in FIG. 3, and may have various shapes such as a hat, a headphone, a head band, and the like.

In addition, a case where the interface control unit 140 causes the voice output unit 170 to output the system utterance as the start notification information has been described as an example in FIG. 1, but the start notification information according to the present embodiment is not limited to such an example. The start notification information according to the present embodiment may be, for example, a jingle J, light such as a flash or the like by the image capturing unit 120, a message, an image, a symbol, or the like, as illustrated in FIG. 3. In addition, the user U may be able to start the measurement of the head-related transfer function by touching a measurement button displayed on the display unit 110.

In addition, the designated direction according to the present embodiment is not necessarily limited to the direction in which the voice output unit 170 is located with the head of the user as the starting point. The designated direction according to the present embodiment may be appropriately set in order to measure the head-related transfer function at a position of an arbitrary ear.

Figure 4:
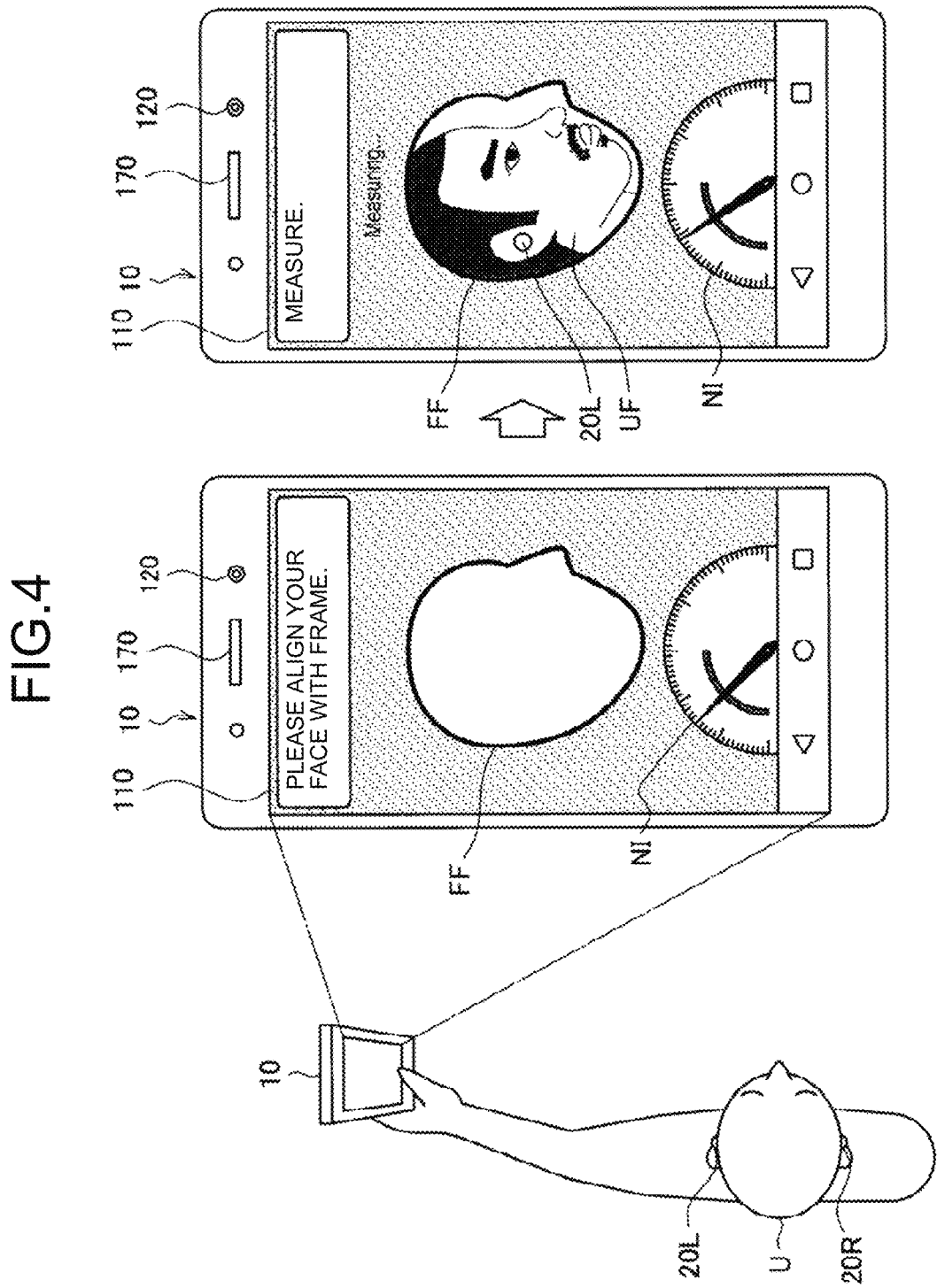
FIG. 4 is a diagram illustrating a specific example of interface control according to the embodiment.

For example, in a case of the example illustrated in FIG. 4, the interface control unit 140 causes the display unit 110 to display the frame object FF guiding the user U to turn his/her profile. As such, the interface control unit 140 according to the present embodiment can also cause the display unit 110 to display the frame object FF having the head shape according to the designated direction. According to the above function of the interface control unit 140 according to the present embodiment, it becomes possible to guide the direction of the head of the user to various designated directions to measure the head-related transfer functions corresponding to various positions of the ears.

In addition, the guide information according to the present embodiment may be voice information. For example, the interface control unit 140 according to the present embodiment may cause the voice output unit 170 to output a voice guiding the direction of the head of the user U to the designated direction.

Figure 5:
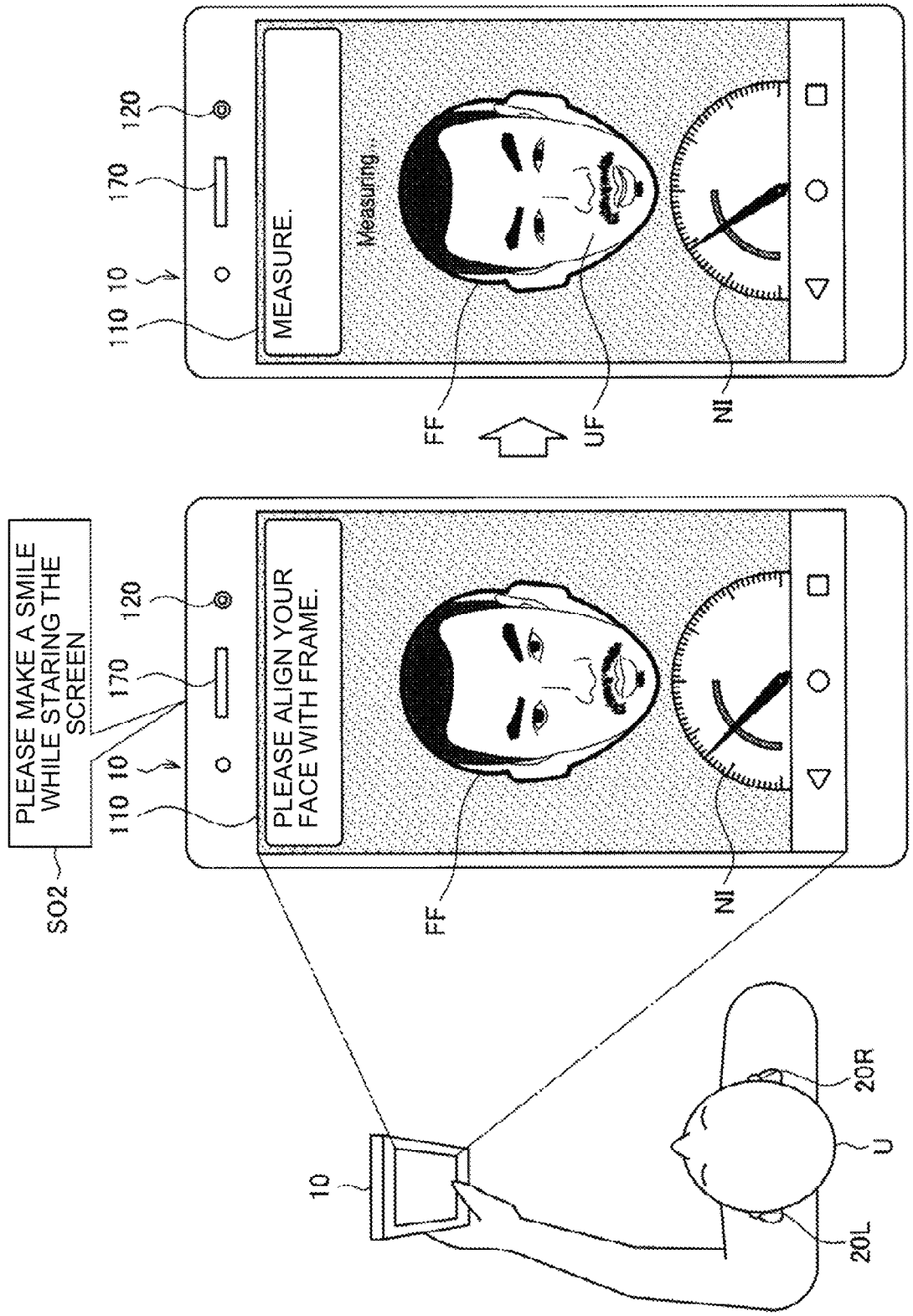
FIG. 5 is a diagram illustrating a specific example of interface control according to the embodiment.

FIG. 5 illustrates an example of a case where the interface control unit 140 causes the signal processing unit 160 to start the measurement processing of the head-related transfer function based on recognition of a smile of the user U by the recognition unit 150. The recognition unit 150 according to the present embodiment can also recognize the direction of the head of the user by the smile recognition as described above.

At this time, the interface control unit 140 may cause the voice output unit 170 to output a system utterance SO2 such as "Please make a smile while staring the screen" or the like to as the guide information. As described above, the interface control unit 140 according to the present embodiment can effectively guide the direction of the head of the user to the designated direction by outputting the guide information as visual information or voice information.

In addition, a case where the user adjusts the direction of the head while capturing his/her image with the image capturing unit 120 (so-called an IN camera) provided on a surface of the display unit 110 of the information processing device 10 has been described above, but the image capturing or the adjustment of the direction of the head of the user may be performed by a collaborator.

Figure 6:
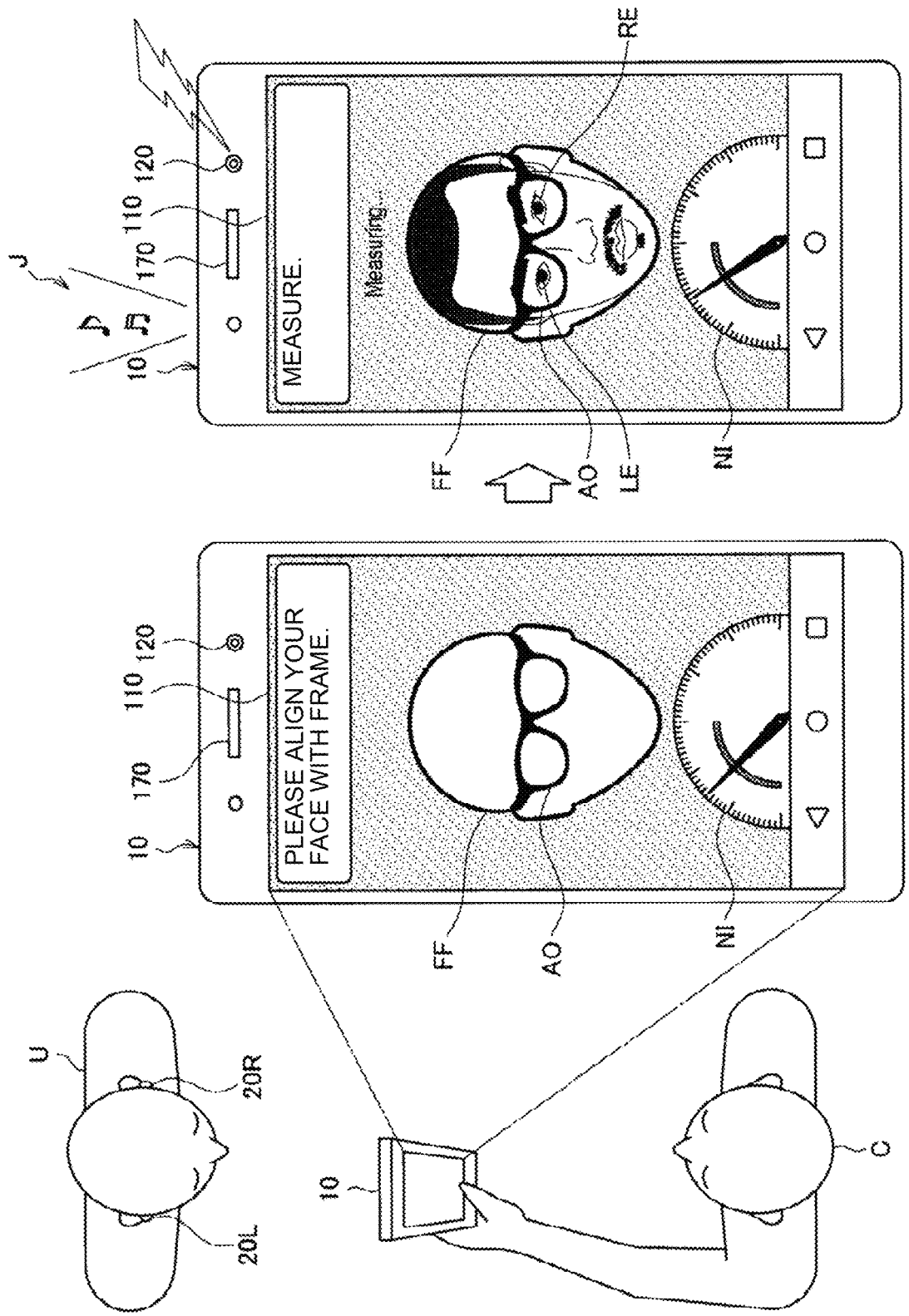
FIG. 6 is a diagram illustrating a specific example of interface control according to the embodiment.

In the example illustrated in FIG. 6, an example of a case where the collaborator C adjusts the direction of the head of the user U while capturing an image of the user U using the image capturing unit 120 (so-called an OUT camera) provided on a back side of the information processing device 10 is illustrated.

As such, according to the information processing device 10 according to the present embodiment, it is also possible to cope with the image capturing or the like by the collaborator, such that it is possible to measure the head-related transfer function with high accuracy even in a case where the user U himself/herself cannot visually recognize the display unit 110 due to factors such as the designated direction and the like.

In addition, at this time, the interface control unit 140 according to the present embodiment may be able to select the voice output unit 170 outputting the measurement signal, based on a position of the image capturing unit 120 selected by an operator such as the user U, the collaborator C or the like via the user interface.

For example, in a case where the user U activates the image capturing unit 120 arranged on a display unit 110 side, the interface control unit 140 may instruct the signal processing unit 160 to cause the voice output unit 170 also arranged on the display unit 110 side to output the measurement signal.

On the other hand, as illustrated in FIG. 6, in a case where the collaborator C activates the image capturing unit 120 arranged on the back side of the information processing device 10, the interface control unit 140 may instruct the signal processing unit 160 to cause the voice output unit 170 also arranged on the back side of the information processing device 10 to output the measurement signal.

According to the above control by the interface control unit 140 according to the present embodiment, by ensuring a path through which the measurement signal output from the voice output unit 170 is directly transmitted to the microphone 20 worn by the user U, it becomes possible to measure the head-related transfer function with high accuracy.

The example of the interface control according to the present embodiment has been described above together with specific examples. Note that the interface control unit 140 according to the present embodiment may have a plurality of user interfaces corresponding to measurement modes of the head-related transfer function, in addition to the user interfaces illustrated in FIGS. 1 and 3 to 6. In this case, the interface control unit 140 according to the present embodiment can control the switching of the user interface based on a selected measurement mode of the head-related transfer function.

The above measurement mode may be set according to, for example, the number of measurement channels. That is, the interface control unit 140 according to the present embodiment can provide the user with a user interface according to the number of measurement channels.

Figure 7:
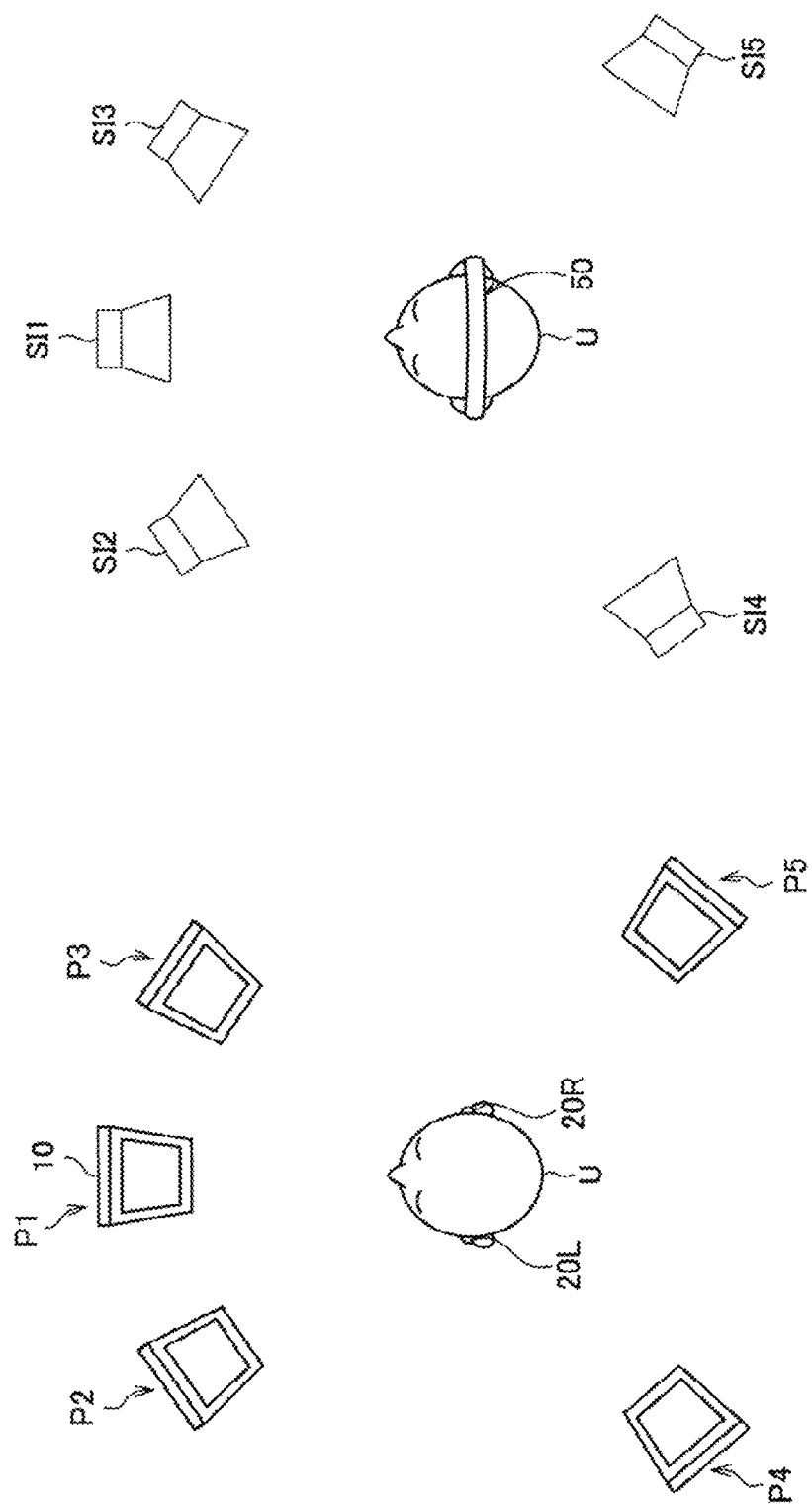
FIG. 7 is a diagram for describing personal optimization of head-related transfer functions of a multi-channel using the information processing device according to the embodiment.

FIG. 7 is a diagram for describing personal optimization of head-related transfer functions of a multi-channel using the information processing device 10 according to the present embodiment. For example, in a case of performing personal optimization of head-related transfer functions of five channels, the user U is required to move the information processing device 10 to five positions P1 to P5 corresponding to the five channels and measure head-related transfer functions at each position, as illustrated on a left side of FIG. 7. Note that the positions P1 to P5 may be relative positions with respect to a front surface of the head of the user U.

At this time, the interface control unit 140 according to the present embodiment causes the display unit 110 to display user interfaces guiding the directions of the head of the user so that the head-related transfer functions can be accurately measured at the positions P1 to P5. According to the above user interface controlled by the interface control unit 140 according to the present embodiment, as illustrated on a right side of FIG. 7, it become possible to reproduce a virtual sound field including five sound images SI1 to SI5 corresponding to the positions P1 to P1 to realize a three-dimensional expression of richer sound.

Figure 8:
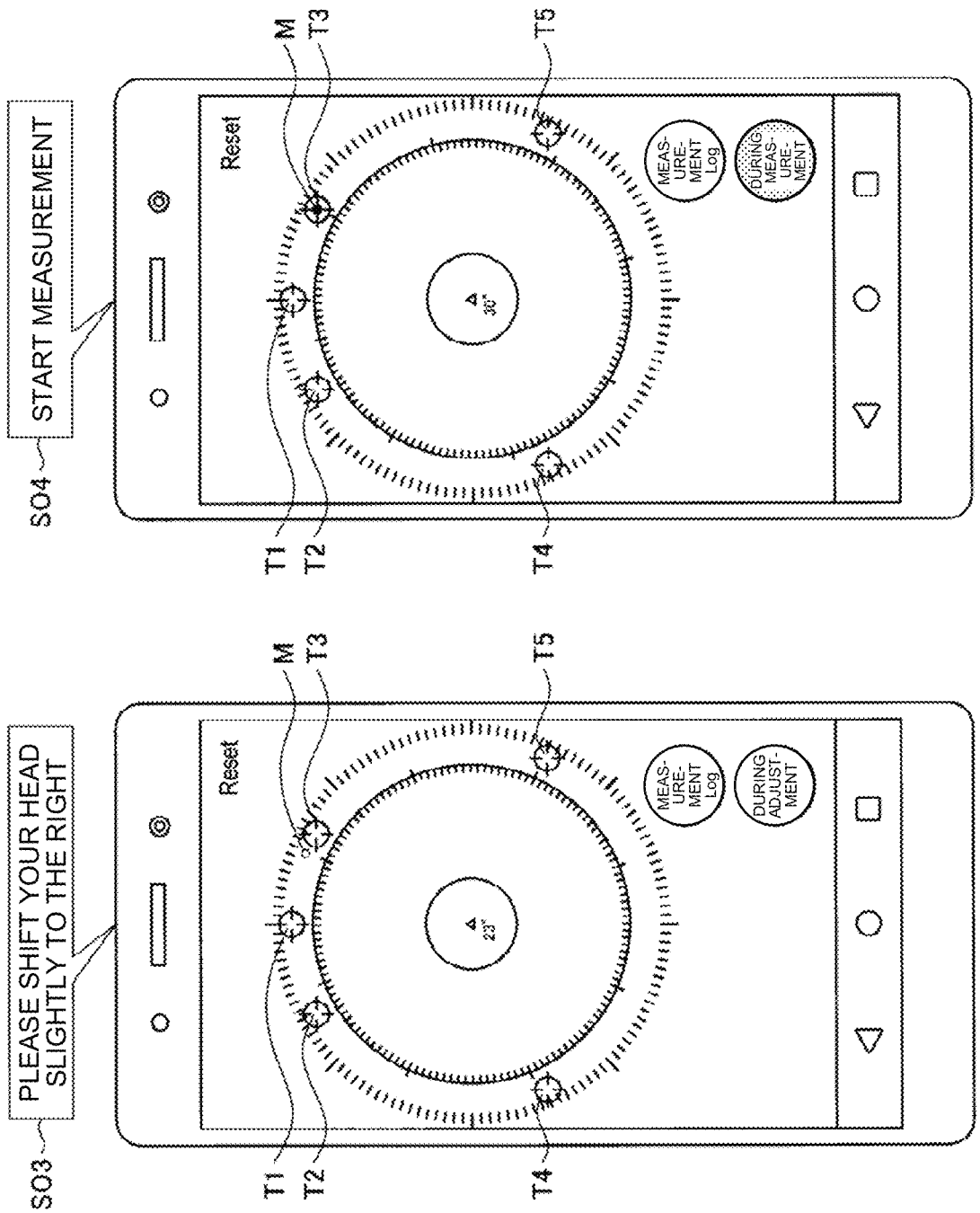
FIG. 8 is a diagram illustrating an example of a user interface corresponding to a multi-channel measurement mode according to the embodiment.

FIG. 8 is a diagram illustrating an example of a user interface corresponding to a multi-channel measurement mode according to the present embodiment. The interface control unit 140 according to the present embodiment causes the display unit 110 to display targets T1 to T5 corresponding to each channel and a marker M indicating the direction of the head of the user recognized by the recognition unit 150, in real time, for example, as illustrated in FIG. 8.

Here, as illustrated on a left side of FIG. 8, in a case where the direction of the head of the user deviates from the designated direction, that is, the targets T1 to T5, the interface control unit 140 may guide the direction of the head of the user by outputting a system utterance SO3 as the guide information.

On the other hand, as illustrated in a left side of FIG. 8, in a case where the direction of the head of the user substantially coincides with the targets T1 to T5, the interface control unit 140 guides the user to grasp the start of the measurement processing and maintain a posture by outputting a system utterance SO4 as the start notification information. The interface control unit 140 according to the present embodiment may repeat the control as described above until the measurement processing is completed for all the targets T.

The personal optimization of the head-related transfer functions of the multi-channel according to the present embodiment has been described hereinabove. As such, according to the information processing device 10 according to the present embodiment, it becomes possible for the user to easily and accurately measure his/her head-related transfer characteristics regardless of the number of channels.

<<1.4. Flow of Control>>

Figure 9:
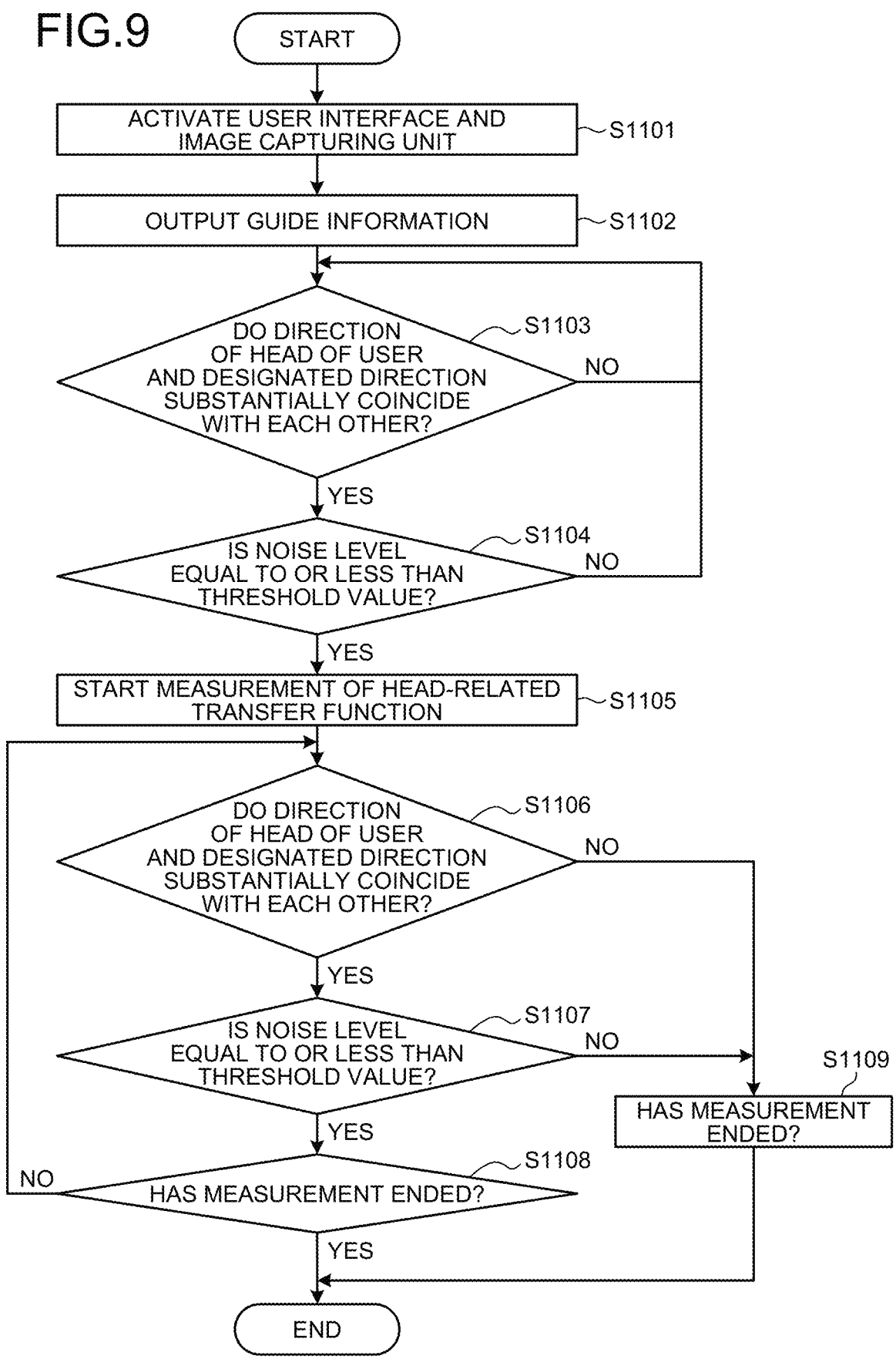
FIG. 9 is a flowchart illustrating a flow of control by an interface control unit according to the embodiment.

Next, a flow of control by the interface control unit 140 according to the present embodiment will be described in detail. FIG. 9 is a flowchart illustrating a flow of control by the interface control unit 140 according to the present embodiment.

Referring to FIG. 9, the interface control unit 140 first activates the user interface and the image capturing unit 120 based on a user operation (S1101).

Next, the interface control unit 140 causes the display unit 110 or the voice output unit 170 to output the guide information (S1102).

Next, the recognition unit 150 determines whether or not the direction of the head of the user and the designated direction substantially coincide with each other (S1103). The recognition unit 150 repeatedly executes the determination processing in Step S1103 until it determines that the direction of the head of the user and the designated direction substantially coincide with each other.

Meanwhile, in a case where it has been determined that the direction of the head of the user and the designated direction substantially coincide with each other (S1103: YES), the recognition unit 150 determines whether or not a noise level in the surrounding environment is equal to or less than a threshold value (S1104).

Here, in a case where the noise level in the surrounding environment exceeds the threshold value (S1104: NO), the recognition unit 150 may return to Step S1103.

On the other hand, in a case where the recognition unit 150 has determined that the noise level in the surrounding environment is equal to or less than the threshold value (S1104: YES), the interface control unit 140 causes the signal processing unit 160 to start the measurement processing of the head-related transfer function (S1105).

Next, the recognition unit 150 again determines whether or not the direction of the head of the user and the designated direction substantially coincide with each other (S1106).

Here, in a case where it has been detected that the direction of the head of the user and the designated direction do not substantially coincide with each other, that is, the direction of the head of the user deviates from the designated direction (S1106: NO), the interface control unit 140 causes the signal processing unit 160 to stop the measurement processing of the head-related transfer function (S1109).

In addition, the recognition unit 150 determines whether or not the noise level in the surrounding environment is equal to or less than the threshold value (S1107).

Here, when it has been detected that the noise level in the surrounding environment exceeds the threshold value (S1107: NO), the interface control unit 140 causes the signal processing unit 160 to stop the measurement processing of the head-related transfer function (S1109).

On the other hand, in a case where the noise level in the surrounding environment is equal to or less than the threshold value (S1107: YES), the interface control unit 140 determines whether or not the measurement processing of the head-related transfer function has ended (S1108).

Here, in a case where the measurement processing of the head-related transfer function has not ended (S1108: NO), the information processing device 10 returns to Step S1106 and repeatedly executes the subsequent determinations.

2. Hardware Configuration Example

Figure 10:
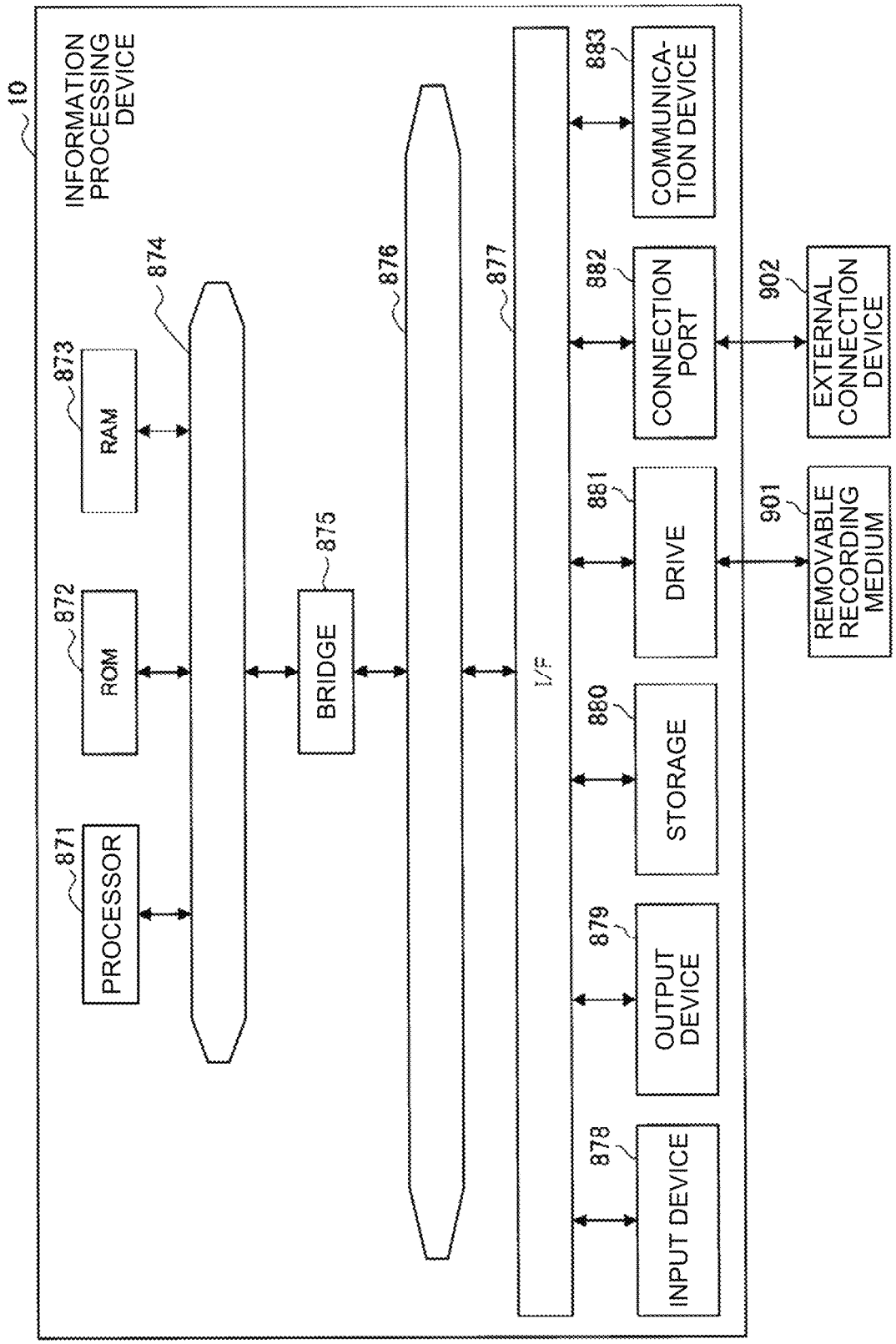
FIG. 10 is a diagram illustrating a hardware configuration example according to the embodiment of the present disclosure.

Next, a hardware configuration example of the information processing device 10 according to the embodiment of the present disclosure will be described. FIG. 10 is a block diagram illustrating a hardware configuration example of the information processing device 10 according to the embodiment of the present disclosure. Referring to FIG. 10, the information processing device 10 includes, for example, a processor 871, a read only memory (ROM) 872, a random access memory (RAM) 873, a host bus 874, a bridge 875, an external bus 876, an interface 877, an input device 878, and an output device 879, a storage 880, a drive 881, a connection port 882, and a communication device 883. Note that the hardware configuration illustrated here is an example, and some of components may be omitted. In addition, the information processing device 10 may further include components other than the components illustrated here.

(Processor 871)

The processor 871 functions as, for example, an arithmetic processing device and a control device, and controls all or some of operations of the respective components based on various programs recorded in the ROM 872, the RAM 873, the storage 880, or a removable recording medium 901.

(ROM 872 and RAM 873)

The ROM 872 is means that stores a program read in the processor 871, data used for calculation, or the like. The RAM 873 temporarily or permanently stores, for example, a program read in the processor 871, various parameters that appropriately change when the program is executed, or the like.

(Host Bus 874, Bridge 875, External Bus 876, and Interface 877)

The processor 871, the ROM 872, and the RAM 873 are connected to each other via, for example, the host bus 874 capable of high-speed data transmission. Meanwhile, the host bus 874 is connected to the external bus 876 having a relatively low data transmission rate via, for example, the bridge 875. In addition, the external bus 876 is connected to various components via the interface 877.

(Input Device 878)

As the input device 878, for example, a mouse, a keyboard, a touch panel, a button, a switch, a lever, or the like is used. Further, as the input device 878, a remote controller (hereinafter, referred to as a remote control) capable of transmitting a control signal using infrared rays or other radio waves may be used. In addition, the input device 878 includes a voice input device such as a microphone or the like.

(Output Device 879)

The output device 879 is, for example, a device capable of visually or audibly notifying a user of acquired information, such as a display device such as a cathode ray tube (CRT), an LCD, an organic electroluminescence (EL), or the like, an audio output device such as a speaker, a headphone or the like, a printer, a mobile phone, a facsimile, or the like. In addition, the output device 879 according to the present disclosure includes various vibrating devices capable of outputting tactile stimuli.

(Storage 880)

The storage 880 is a device for storing various data. As the storage 880, for example, a magnetic storage device such as a hard disk drive (HDD) or the like, a semiconductor storage device, an optical storage device, a magneto-optical storage device, or the like is used.

(Drive 881)

The drive 881 is, for example a device that reads information recorded in the removable recording medium 901 such as a magnetic disk, an optical disk, a magneto-optical disk, a semiconductor memory, or the like, or writing information in the removable recording medium 901.

(Removable Recording Medium 901)

The removable recording medium 901 is, for example, a digital versatile disc (DVD) medium, a Blu-ray (registered trademark) medium, a high definition DVD (HD DVD) medium, various semiconductor storage media, or the like. Of course, the removable recording medium 901 may be, for example, an integrated circuit (IC) card on which a non-contact type IC chip is mounted, an electronic device, or the like.

(Connection Port 882)

The connection port 882 is, for example, a port for connecting an external connection device 902, such as a universal serial bus (USB) port, an IEEE1394 port, a small computer system interface (SCSI), an RS-232C port, an optical voice terminal, or the like.

(External Connection Device 902)

The external connection device 902 is, for example, a printer, a portable music player, a digital camera, a digital video camera, IC recorder, or the like.

(Communication Device 883)

The communication device 883 is a communication device for connection to a network, and is, for example, a wired or wireless local area network (LAN), Bluetooth (registered trademark), or a communication card for wireless USB (WUSB), a router for optical communication, a router for asymmetric digital subscriber line (ADSL), a modem for various communications, or the like.

3. Summary

As described above, the information processing device 10 according to the embodiment of the present disclosure includes the interface control unit 140 that controls the user interface related to the measurement of the head-related transfer function of the user. In addition, one of features of the interface control unit 140 according to the embodiment of the present disclosure is to control an output of guide information guiding a direction of a head of the user to a designated direction. According to such a configuration, it becomes possible to the user to measure his/her head-related transfer characteristics with high accuracy.

Hereinabove, the preferred embodiments of the present disclosure have been described in detail with reference to the accompanying drawings, but a technical scope of the present disclosure is not limited to such examples. It will be apparent to those skilled in the art of the present disclosure that various modifications or alterations can be conceived within the scope of the technical idea described in the claims, and it is naturally understood that these modifications or alterations also fall within the technical scope of the present disclosure.

In addition, the effects described in the present specification are only illustrative or exemplary rather than being restrictive. That is, the technology according to the present disclosure can accomplish other effects apparent to those skilled in the art from the description of the present specification, in addition to or instead of the effects described above.

In addition, a program for causing hardware such as a CPU, a ROM, a RAM, and the like, built in a computer to exhibit the same functions as that of a configuration of the information processing device 10 can also be created, and a computer-readable non-transient recording medium on which the program is recorded can also be provided.

In addition the respective steps in the processing of the information processing device 10 of the present specification do not necessarily have to be processed in time series in the order described as the flowchart. For example, the respective steps in the processing of the information processing device 10 may be processed in the order different from the order described as the flowchart or may be processed in parallel with one another.

Note that the following configurations also fall within the technical scope of the present disclosure.

(1)

An information processing device comprising:
an interface control unit that controls a user interface related to measurement of a head-related transfer function of a user,
wherein the interface control unit controls an output of guide information guiding a direction of a head of the user to a designated direction.

(2)

The information processing device according to (1), wherein the guide information includes visual information, and
the interface control unit causes a display unit to display a guide object guiding the direction of the head of the user to the designated direction.

(3)

The information processing device according to (2), wherein the interface control unit causes the display unit to display a captured image of the user in real time, and superimposes the guide object on the image of the user.

(4)

The information processing device according to (2), wherein the guide object includes a frame object having a head shape according to the designated direction.

(5)
The information processing device according to (3) to (4), wherein the guide object includes a wearable object worn on the head.
(6)
The information processing device according to any one of (1) to (5), wherein the guide information includes voice information, and
    the interface control unit causes a voice output unit to output a voice guiding the direction of the head of the user to the designated direction.
(7)
The information processing device according to any one of (1) to (6), wherein the designated direction is a direction in which a voice output unit outputting a measurement signal related to the measurement of the head-related transfer function is located with the head of the user as a starting point.
(8)
The information processing device according to any one of (1) to (5), wherein the interface control unit controls an output of start notification information indicating start of the measurement of the head-related transfer function, based on a determination that the direction of the head of the user has substantially coincided with the designated direction.
(9)
The information processing device according to any one of (1) to (8), wherein the interface control unit controls switching of the user interface based on a measurement mode of the head-related transfer function.
(10)
The information processing device according to (9), wherein the measurement mode is set according to the number of measurement channels.
(11)
The information processing device according to any one of (1) to (10), wherein the interface control unit causes a mobile terminal including a voice output unit outputting a measurement signal related to the measurement of the head-related transfer function to output the guide information.
(12)
The information processing device according to (11), wherein the mobile terminal includes at least two image capturing units and at least two the voice output units, and
    the interface control unit selects the voice output unit outputting the measurement signal based on a position of the image capturing unit selected by an operator via the user interface.
(13)
The information processing device according to any one of (1) to (12), wherein the interface control unit starts measurement processing of the head-related transfer function based on a determination that the direction of the head of the user has substantially coincided with the designated direction.
(14)
The information processing device according to (13), wherein the interface control unit interrupts the measurement processing of the head-related transfer function based on a determination that the direction of the head of the user has not substantially coincided with the designated direction from after starting the measurement processing of the head-related transfer function until the measurement processing ends.
(15)
The information processing device according to (13) or (14), wherein the interface control unit performs control so that the measurement processing is not started in a case where a measured noise level exceeds a threshold value.
(16)
The information processing device according to (15), wherein the interface control unit interrupts the measurement processing when it has been detected that the noise level has exceeded the threshold value after starting the measurement processing of the head-related transfer function.
(17)
The information processing device according to (15) or (16), wherein the interface control unit controls an output of noise information regarding the measured noise level.
(18)
The information processing device according to any one of (1) to (17), further comprising a recognition unit that recognizes the direction of the head of the user.
(19)
    An information processing method comprising:
    controlling a user interface related to measurement of a head-related transfer function of a user by a processor,
    wherein the controlling of the user interface further includes controlling an output of guide information guiding a direction of a head of the user to a designated direction.
(20)
    A program for causing a computer to function as an information processing device, the information processing device including:
    an interface control unit that controls a user interface related to measurement of a head-related transfer function of a user,
    wherein the interface control unit controls an output of guide information guiding a direction of a head of the user to a designated direction.

REFERENCE SIGNS LIST

10 INFORMATION PROCESSING DEVICE
110 DISPLAY UNIT
120 IMAGE CAPTURING UNIT
130 SENSOR UNIT
140 INTERFACE CONTROL UNIT
150 RECOGNITION UNIT
160 SIGNAL PROCESSING UNIT
170 VOICE OUTPUT UNIT
20 MICROPHONE

The invention claimed is:
1. An information processing device comprising:
circuitry configured to:
display a guide object with a captured image of a user;
determine whether a part of a body of the user is inside the guide object, wherein the guide object is used in a process for acquiring data related to a head-related transfer function; and
control acquisition of the data related to the head-related transfer function of the user based on information indicating whether the part of the body of the user is inside the guide object, wherein the circuitry is configured to start acquisition of the data related to the head-related transfer function based on information indicating that the part of the body of the user is inside the guide object and to interrupt the acquisition of the data related to the head-related transfer function based on information indicating that the part of the body of the user is not inside the guide object.

2. The information processing device according to claim 1, wherein the circuitry is configured to:
cause a display unit to display the guide object to guide a direction of the head of the user to a designated direction.

3. The information processing device according to claim 1, wherein the guide object includes a frame object having a head shape according to a designated direction.

4. The information processing device according to claim 1, wherein the guide object includes a wearable object worn on the head of the user.

5. The information processing device according to claim 1, wherein the circuitry is configured to cause a voice output unit to output a voice to guide a direction of the head of the user to the designated direction.

6. The information processing device according to claim 1, wherein the circuitry is configured to control an output of start notification information indicating a start of the acquisition of the data of the head-related transfer function, based on a determination that a direction of the head of the user has substantially coincided with a designated direction.

7. The information processing device according to claim 1, wherein the circuitry is configured to cause a mobile terminal, including a voice output unit outputting a measurement signal related to the acquisition of the data related to the head-related transfer function, to display the guide object.

8. The information processing device according to claim 1, wherein the circuitry is configured to perform control so that the acquisition of the data is not started in a case where a measured noise level exceeds a threshold value.

9. The information processing device according to claim 8, wherein the circuitry is configured to interrupt the acquisition of the data when it has been detected that the noise level has exceeded the threshold value after starting the acquisition of the data related to of the head-related transfer function.

10. The information processing device according to claim 8, wherein the circuitry is configured to control an output of noise information regarding the measured noise level.

11. The information processing device according to claim 1, wherein the circuitry is further configured to recognize a direction of the head of the user.

12. An information processing device comprising:
circuitry configured to:
display a guide object with a captured image of a user, wherein the guide object is used in a process for acquiring data related to a head-related transfer function, and wherein the guide object includes a first guide object and a second guide object, and the circuitry is configured to:
display the first guide object guiding a direction of a head of the user to a designated direction;
display the captured image of the user and the first guide object with the captured image of the user;
display the second guide object with the captured image of the user;
determine whether the part of the body of the user is inside the second guide object; and
control the acquisition of the data related to the head-related transfer function based on information indicating whether the part of the body of the user is inside the second guide object.

13. An information processing method executed by circuitry, the method comprising:
displaying a guide object with a captured image of a user;
determining whether a part of a body of the user is inside the guide object, wherein the guide object is used in a process for acquiring data related to a head-related transfer function; and
controlling acquisition of the data related to the head-related transfer function of the user based on information indicating whether the part of the body of the user is inside the guide object, wherein controlling the acquisition includes starting acquisition of the data related to the head-related transfer function based on information indicating that the part of the body of the user is inside the guide object and interrupting the acquisition of the data related to the head-related transfer function based on information indicating that the part of the body of the user is not inside the guide object.

14. An information processing method executed by circuitry, the method comprising:
displaying a guide object with a captured image of a user, wherein the guide object is used in a process for acquiring data related to a head-related transfer function, and wherein the guide object includes a first guide object and a second guide object, and the method includes:
displaying the first guide object guiding a direction of a head of the user to a designated direction;
displaying the captured image of the user and the first guide object with the captured image of the user;
displaying the second guide object with the captured image of the user;
determining whether the part of the body of the user is inside the second guide object; and
controlling the acquisition of the data related to the head-related transfer function based on information indicating whether the part of the body of the user is inside the second guide object.

15. A non-transitory computer readable medium storing instructions that, when executed by circuitry, perform an information processing method comprising:
displaying a guide object with a captured image of a user;
determining whether a part of a body of the user is inside the guide object, wherein the guide object is used in a process for acquiring data related to a head-related transfer function; and
controlling acquisition of the data related to the head-related transfer function of the user based on information indicating whether the part of the body of the user is inside the guide object, wherein controlling the acquisition includes starting acquisition of the data related to the head-related transfer function based on information indicating that the part of the body of the user is inside the guide object and interrupting acquisition of the data related to the head-related transfer function based on information indicating that the part of the body of the user is not inside the guide object.

16. A non-transitory computer readable medium storing instructions that, when executed by circuitry, perform an information processing method comprising:
displaying a guide object with a captured image of a user, wherein the guide object is used in a process for acquiring data related to a head-related transfer function, and wherein the guide object includes a first guide object and a second guide object, and the method includes:
displaying the first guide object guiding a direction of a head of the user to a designated direction;

displaying the captured image of the user and the first guide object with the captured image of the user;

displaying the second guide object with the captured image of the user;

determining whether the part of the body of the user is inside the second guide object; and controlling acquisition of the data related to the head-related transfer function based on information indicating whether the part of the body of the user is inside the second guide object.

* * * * *